United States Patent [19]

Merkel et al.

[11] Patent Number: 5,516,985
[45] Date of Patent: May 14, 1996

[54] CABLE END CAP

[75] Inventors: Jurgen Merkel, Herisau; Erich Wickli, Weinfelden, both of Switzerland

[73] Assignee: Huber & Suhner AG, Herisau, Switzerland

[21] Appl. No.: 291,000

[22] Filed: Aug. 24, 1994

[30] Foreign Application Priority Data

Jan. 8, 1993 [DE] Germany .............................. 9300184 U

[51] Int. Cl.⁶ ................................................. H02G 15/02
[52] U.S. Cl. ...................... 174/74 A; 174/77 R; 174/82; 174/138 F
[58] Field of Search ................... 174/74 R, 74 A, 174/77 R, 82, 138 F

[56] References Cited

U.S. PATENT DOCUMENTS

| | | | |
|---|---|---|---|
| 3,518,358 | 6/1970 | Brown | 174/138 F |
| 3,710,003 | 1/1973 | Channell | 174/77 R |
| 3,725,581 | 4/1973 | Gillemot et al. | 174/77 R |
| 3,728,467 | 4/1973 | Klayum et al. | 174/77 R |
| 3,848,074 | 11/1974 | Channell | 174/77 R |
| 3,984,623 | 10/1976 | Worden | 174/138 F |
| 4,002,818 | 1/1977 | Kunzel | 174/77 R |
| 5,198,620 | 3/1993 | Behrendt et al. | 174/74 R |
| 5,235,134 | 8/1993 | Jaycox | 174/87 |
| 5,302,779 | 4/1994 | Morel et al. | 174/92 |
| 5,399,811 | 3/1995 | Fremgen | 174/93 |

FOREIGN PATENT DOCUMENTS

| | | |
|---|---|---|
| 2645934 | 4/1978 | Germany . |
| 3911688 | 10/1990 | Germany . |
| 653818 | 1/1986 | Switzerland . |

*Primary Examiner*—Morris H. Nimmo
*Attorney, Agent, or Firm*—Sughrue, Mion, Zinn, Macpeak & Seas

[57] ABSTRACT

A cable end cap including a tubular sleeve (3), which is closed at a front end and is made of a thermoplastic material, and an elastomer sealing element (4) with sealing lips (41). Sleeve (3) and sealing element (4) are connected sealingly together by a mounting ring (10). Thus, cut off cable ends can be sealed reliably with little complexity.

17 Claims, 2 Drawing Sheets

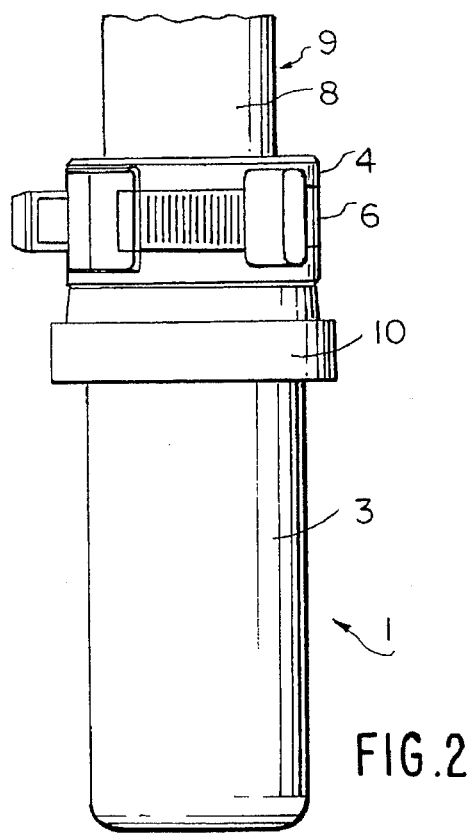
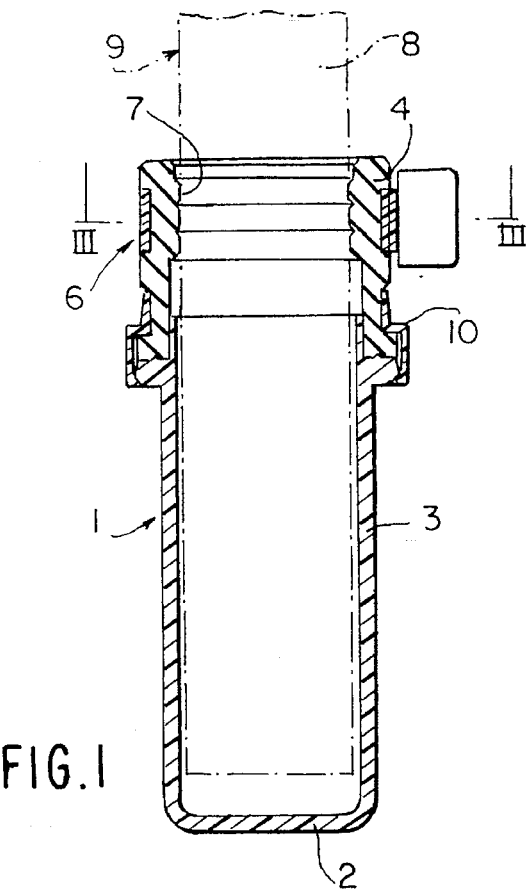
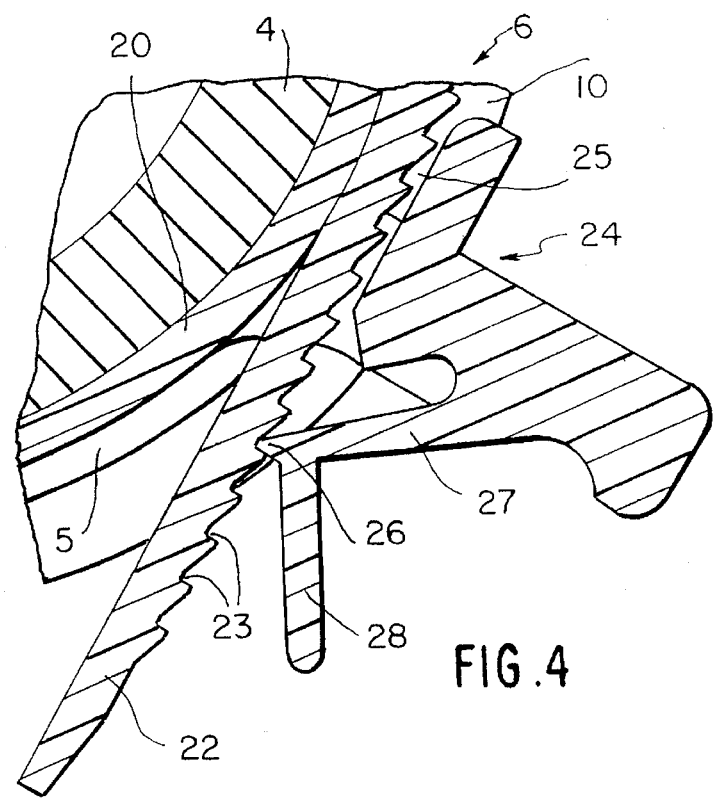
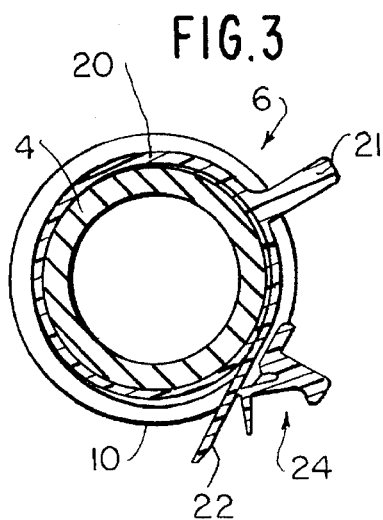

FIG.6
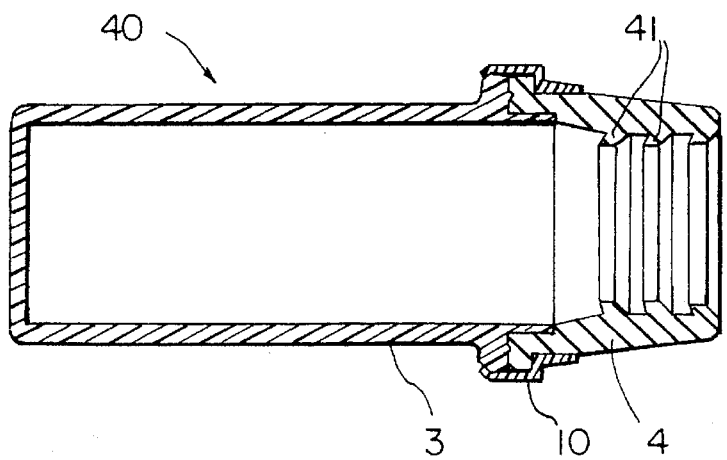
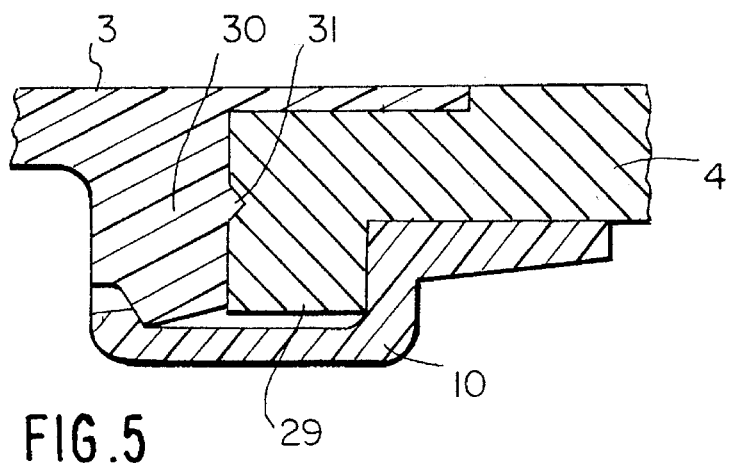
FIG.5
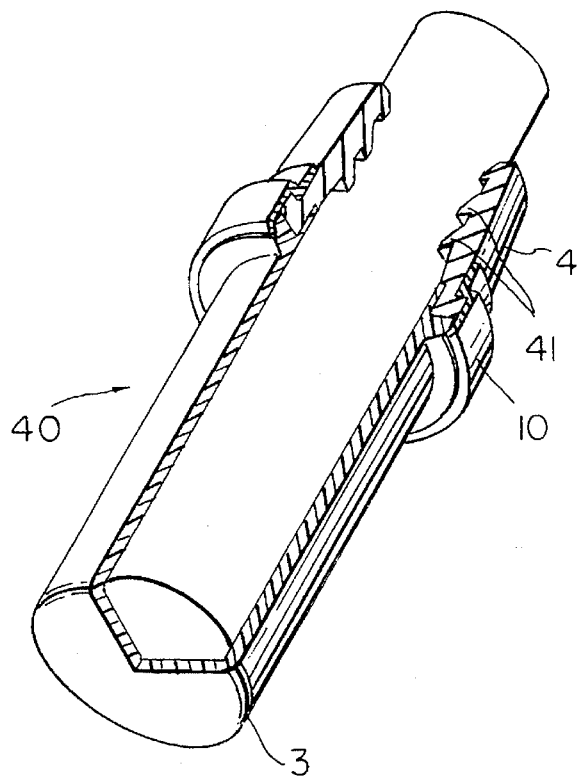
FIG.7

CABLE END CAP

Cable end caps are needed for sealing the cut off ends of an electric cable when laying cables. Above all, they are to prevent water and moisture from penetrating. Past solutions to this problem have been time consuming to manufacture and use. Known, for example, is a shrink cap that is shrunk on the cable end with hot air at the construction site.

The present invention is based on the problem of remedying the above drawback. This problem is solved with the combined features of the claims.

The following embodiments of the invention are explained with reference to the drawings, in which FIG. 1 is an axial view of a cable end cap.

FIG. 2 is a top view of the cap according to FIG. 1.

FIG. 3 is a sectional view along the line III—III in FIG. 1.

FIG. 4 is an enlarged fragment of the drawing according to FIG. 3.

FIG. 5 is an enlarged fragment from FIG. 1 and FIG. 6.

FIG. 6 is an axial view of a second embodiment; and

FIG. 7 is a perspective view, in part a sectional view.

In the embodiment according to FIGS. 1 to 4 the cable end cap comprises a tubular thermoplastic sleeve 3, which is made, e.g., of HDPE and is closed at one end by a front wall 2; a sealing element 4; a strap 6, which is embedded into a circumferential groove 5 of the sealing element 4; and a mounting ring 10, which holds together sealing element 4 and sleeve 3. The sealing element 4 is made of a soft elastomer, e.g. silicone rubber. The internal diameter of the sealing ring 4 that is formed by a sealing collar 7 rests gas- and water-tight against the outer circumference 8 of a cable end 9 when the strap 6 is stretched.

The strap 6 is injection moulded of a thermoplastic, e.g. PA 6.6, and comprises a band 20 with a radially protruding gripping body 21, on whose one side the band 20 is designed as a tongue 22 with saw-toothed notches 23 on the outside. A pusher 24 has a rectangular passage opening 25 in order to push through the tongue 22. A bending spring 27, which pushes against the tongue 22 and with a tooth 26 mates with one of the notches 23, is moulded to the pusher 24. A protruding nose 28 of the spring 27 facilitates the release of the tooth engagement.

A flange 29 of the sealing element 4 is pressed by means of the snapped-on mounting ring 10, made for example of HDPE, against a flange 30 of the sleeve 3. A peripheral projection 31 of the flange 30 provides for a reliable seal.

During assembly the cable end cap 1 is slid over the cut off end of a cable 9 and then the strap 6 is stretched by pressing pusher 24 and gripping body 21 against one another. If a relatively soft elastomer is used for the sealing element, the strap 6 makes it possible to reduce the internal diameter of the sealing element 4 by 4–8 mm, so that the end cap according to FIGS. 1–4 can be applied to a suitable diameter region of the cable 9.

In the case of the embodiment according to FIGS. 6 and 7 the sealing element 4 has internal, saw-toothed sealing lips 41. Said sealing element is also made of a soft elastomer and is connected in the same manner by means of a mounting ring 10 to the sleeve 3. The inner diameter over the sealing lips 41 is approximately 2 mm smaller than the diameter of the cable end to be sealed. The elastic deformation of the sealing element 4 and the sealing lips 41 when sliding on the cable end produces the necessary contact pressure on the cable sheath. The saw-tooth profile of the sealing lips 41 prevents in a reliable manner the end cap from sliding off the cable end.

The tension force at the entrance diameter can be kept smaller by tapering the wall thickness and expanding the front sealing lip. With this measure the cable diameter region can be expanded at the top (large cable diameters can also be inserted without any problems).

The strap 6 according to FIG. 1 to 4 can also be used in combination with the end cap 40 according to FIGS. 6 and 7, or for other applications, where straps are necessary.

We claim:

1. Cable end cap for sealing a cut off end of a cable (9), comprising a tubular sleeve (3) having a first end closed by a front wall (2), a sealing element (4) coupled to said sleeve, and sealing means (7, 41) provided on an inner circumferential surface of said sealing element for sealingly engaging a cylindrical external circumference (8) of the cable (9), wherein a strap (6) is disposed in a groove (5) formed in an external circumference of the sealing element (4), and wherein said strap (6) comprises a band (20) having a radially protecting gripping body (21), a tongue (22) with externally saw-toothed grooves (23), and a pusher (24) which is secured to said band at an end of said band opposite said tongue, said pusher having an opening (25) through which said tongue (22) is inserted and at least one tooth (26) which mates with one of the grooves (23) in said tongue, wherein said gripping body and said pusher are squeezed together to tighten said strap in said groove around said sealing element.

2. Cable end cap, as claimed in claim 1, wherein said at least one tooth (26) is disposed at a distal end of a resilient arm (27) protruding from said pusher.

3. Cable end cap, as claimed in claim 2, further comprising a protruding nose (28) secured to said resilient arm (27) for displacing said resilient arm to release engagement between said at least one tooth (26) at the distal end of said resilient arm (27) and said one of the grooves (23) in said tongue.

4. Cable end cap, as claimed in claim 1, wherein said strap (6) comprises a single piece of plastic.

5. Cable end cap, as claimed in claim 1, wherein said sealing means comprises saw-toothed sealing lips (41).

6. Cable end cap, as claimed in claim 1, further comprising a mounting ring (10) for connecting said sealing element (4) and said sleeve (3).

7. Cable end cap, as claimed in claim 1, wherein said sleeve (3) comprises a thermoplastic material.

8. Cable end cap, as claimed in claim 1, wherein said selaing means comprises a sealing collar (7).

9. Cable end cap for sealing a cut off end of a cable (9), comprising a tubular sleeve (3) having a first end closed by a front wall (2), an elastomer sealing element (4) coupled to said sleeve, and sealing means (7, 41) provided on an inner circumferential surface of said sealing element for sealingly engaging a cylindrical external circumference (8) of the cable (9), said cable end cap further comprising a mounting ring (10) for connecting said sealing element (4) and said sleeve (3).

10. Cable end cap, as claimed in claim 9, wherein a strap (6) is disposed in a groove (5) formed in an external circumference of the sealing element (4).

11. Cable end cap, as claimed in claim 10, wherein said strap (6) comprises a band (20) having a radially projecting gripping body (21), a tongue (22) with externally saw-toothed grooves (23), and a pusher (24) which is secured to said band at an end of said band opposite said tongue, said pusher having an opening (25) through which said tongue (22) is inserted and at least one tooth (26) which mates with one of the grooves (23) in said tongue, wherein said gripping body and said pusher are squeezed together to tighten said strap in said groove around said sealing element.

12. Cable end cap, as claimed in claim 10, wherein said strap (6) comprises a single piece of plastic.

13. Cable end cap, as claimed in claim 9, wherein said sealing means comprises saw-toothed sealing lips (41).

14. Cable end cap, as claimed in claim 9, wherein said sealing means comprises a sealing collar (7).

15. Cable end cap, as claimed in claim 9, wherein said sleeve (3) comprises a thermoplastic material.

16. Cable end cap, as claimed in claim 9, wherein said mounting ring (10) is a resilient snap on mounting ring for snap fitting said sealing element (4) and said sleeve (3).

17. Cable end cap, as claimed in claim 11, wherein said at least one tooth (26) is disposed at a distal end of a resilient arm (27) protruding from said pusher.

* * * * *